(12) United States Patent
Kramer et al.

(10) Patent No.: US 7,116,680 B1
(45) Date of Patent: Oct. 3, 2006

(54) PROCESSOR ARCHITECTURE AND A METHOD OF PROCESSING

(75) Inventors: David B Kramer, Austin, TX (US); David P Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 806 days.

(21) Appl. No.: 09/798,112

(22) Filed: Mar. 2, 2001

Related U.S. Application Data

(60) Provisional application No. 60/186,516, filed on Mar. 2, 2000, provisional application No. 60/186,424, filed on Mar. 2, 2000.

(51) Int. Cl.
H04L 12/56 (2006.01)
H04J 3/22 (2006.01)

(52) U.S. Cl. .................. 370/465; 370/395.4
(58) Field of Classification Search ............ 370/468, 370/389, 391, 392, 394, 395.1, 395.21, 395.4, 370/412, 428
See application file for complete search history.

(56) References Cited

U.S. PATENT DOCUMENTS

| | | | |
|---|---|---|---|
| 6,243,365 B1 * | 6/2001 | Mansfield et al. | 370/310 |
| 6,381,242 B1 * | 4/2002 | Maher et al. | 370/394 |
| 6,654,373 B1 * | 11/2003 | Maher et al. | 370/392 |
| 6,711,126 B1 * | 3/2004 | Besset-Bathias | 370/229 |
| 6,781,994 B1 * | 8/2004 | Nogami et al. | 370/395.1 |
| 6,795,435 B1 * | 9/2004 | Jouppi et al. | 370/394 |
| 6,819,658 B1 * | 11/2004 | Agarwal et al. | 370/316 |
| 6,917,614 B1 * | 7/2005 | Laubach et al. | 370/392 |
| 2001/0012294 A1 * | 8/2001 | Kadambi et al. | 370/391 |
| 2002/0099855 A1 * | 7/2002 | Bass et al. | 709/249 |
| 2004/0017812 A1 * | 1/2004 | Kamo | 370/395.1 |

* cited by examiner

Primary Examiner—Brian Nguyen

(57) ABSTRACT

A process and architecture to simplify the implementation of a high-speed scheduler. A traditional packet based scheduler works the length of the packet. Instead, the present invention uses a transmit queue that determines how many times a portion of a packet needs to be transmitted independent of the process to modify or transform the packet. The packet could be an ATM cell, it could be a fabric cell, or it could be a portion of a frame-based transmission of the packet. As a result, the transmit queue need only determine how many times (times to transmit (TTT)) to schedule transmission of part of the packet. The determined TTT from the transit queue takes into account the packet-based modifications that will be performed on the packet. The TTT is used to determine how many cells the packet needs to be divided into. In another illustrative embodiment, the number of cells or the TTT is determined prior to adding or removing data from the packet. In a further illustrative embodiment, the transmit queue is separate from the circuitry that modifies the packet. In other words, determining the TTT for a packet is separate from the process of modifying the packet for transmission.

18 Claims, 2 Drawing Sheets

PROCESSOR ARCHITECTURE AND A METHOD OF PROCESSING

RELATED APPLICATIONS

This application claims priority from provisional application Ser. No. 60/186,516 entitled RSP and filed on Mar. 2, 2000 and provisional application Ser. No. 60/186,424 entitled FPP and filed on Mar. 2, 2000. Each of these provisional applications is incorporated herein by reference. This application is also related to patent application Ser. No. 09/798,092 entitled PAYLOAD ARCHITECTURE filed on Mar. 2, 2001. This application is incorporated herein by reference.

FIELD OF THE INVENTION

The present invention relates generally to network processors and, more particularly, to a high speed scheduler for a network processor.

BACKGROUND OF THE INVENTION

Communication systems are continually undergoing increased demands to process data at every increasing speeds. Accordingly, there is a need to provide processor architectures that can operate in communication systems at these increased speeds.

SUMMARY OF THE INVENTION

The present invention is directed to a process to simplify the implementation of a high-speed scheduler. A traditional packet based scheduler works the length of the packet. Instead, the present invention uses a transmit queue that determines how many times a portion of a packet needs to be transmitted independent of the process to modify or transform the packet. The packet could be an ATM cell, it could be a fabric cell, or it could be a portion of a frame-based transmission of the packet. As a result, the transmit queue need only determine how many times (times to transmit (TTT)) to schedule transmission of part of the packet. The determined TTT from the transit queue takes into account the packet-based modifications that will be performed on the packet. The TTT is used to determine how many cells the packet needs to be divided into. In another illustrative embodiment, the number of cells or the TTT is determined prior to adding or removing data from the packet. In a further illustrative embodiment, the transmit queue is separate from the circuitry that modifies the packet. In other words, determining the TTT for a packet is separate from the process of modifying the packet for transmission.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figure.

DETAILED DESCRIPTION OF THE INVENTION

Figure 1:
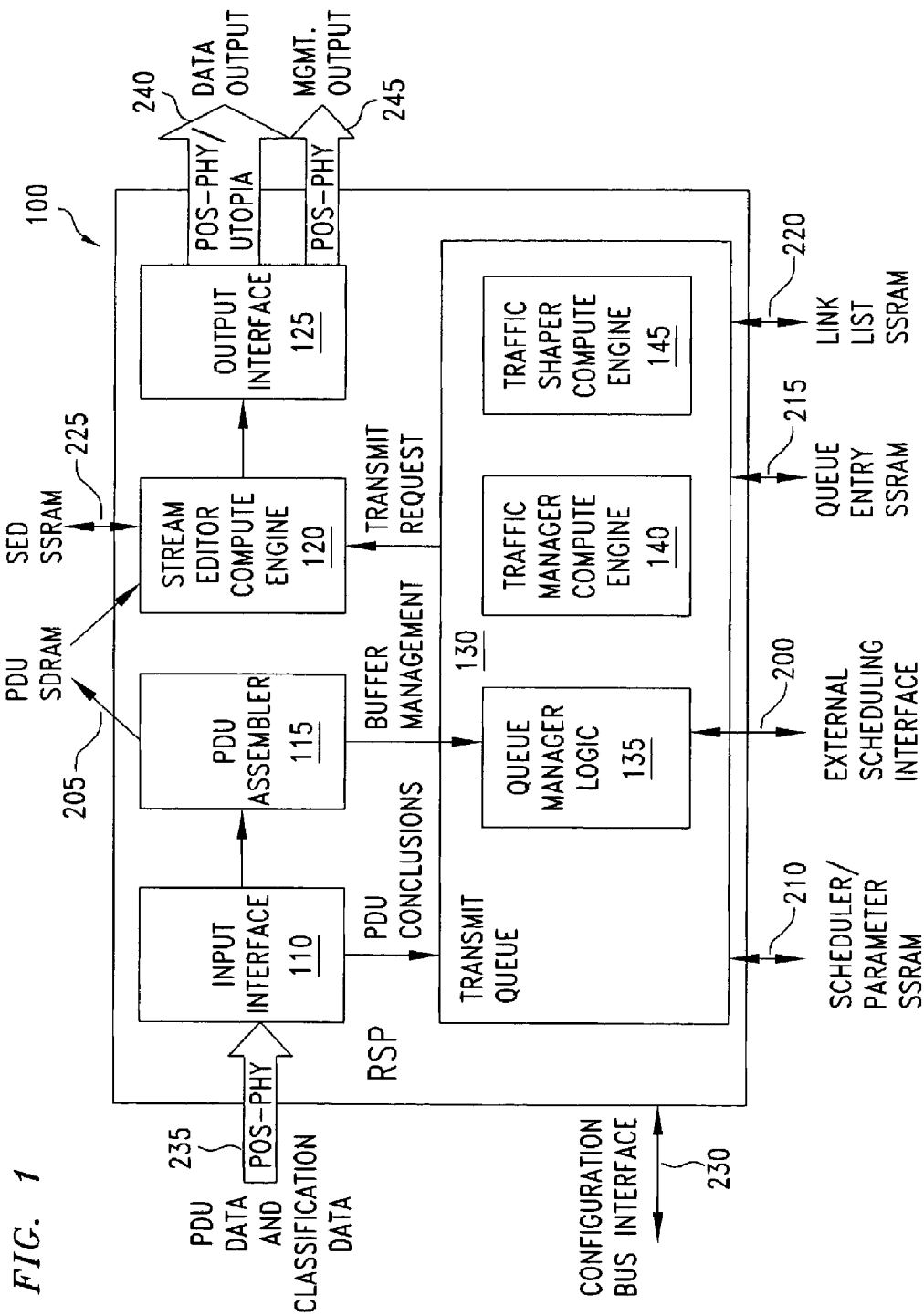
FIG. 1 is a block diagram of a processor architecture according to an illustrative embodiment of the present invention.

Referring now to the drawing, wherein like reference numerals refer to like elements throughout, FIG. 1 is a block diagram of an illustrative processor architecture 100 according to the present invention. Briefly, the present is directed to a process to simplify the implementation of a high-speed scheduler such as the transmit queue 130. The illustrative embodiment of the present invention determines how many times a portion of a packet needs to be transmitted independent of the process and circuitry that modifies the packet. As a result, the transmit queue 130 need only determine how many times (times to transmit (TTT)) to schedule transmission of part of the packet. Part of the packet refers to the size of a cell that will be transmitted by the RSP over a particular interface or according to a particular standard.

The determined TTT from the transit queue takes into account the packet-based modifications that will be performed on the packet. In other words, the TTT is used to determine the number cells that need to be transmitted so that the entire packet is transmitted in its modified or unmodified state from the RSP. The packet is modified by a stream editor and compute engine 120 that may be separate from the transmit queue 130. Further, the number of cells that a packet is to be separated into may be determined prior to modifying the packet or prior to modifying the packet by the stream editor and compute engine 120. When doing cell based transmission, it is the number of cells that may be equivalent to the TTT. In the case of frame based transmission, each schedule to the stream editor compute engineer 120 transmits the next part of the packet. In any case, the TTT is the number of times that the transmit queue schedules the stream editor compute engineer 120 to transmit.

Turning to FIG. 1, the routing switch processor (RSP) receives protocol data units (PDUs) and classification data classifying the PDUs. The PDUs are packets of data. To process these packets, the RSP 100 includes an input interface 110, a PDU assembler 115, the stream editor and compute engine 120, an output interface 125, and the transmit queue 130. The transmit queue 130 includes queue manager logic 135, a traffic manager compute engine 140, and a traffic shaper compute engine 145. The classification data is used by the transmit queue 130 and the stream editor compute engine 120 to process the PDU.

The stream editor compute engineer 120 engine receives a destination identification requests from the transmit queue 130 which is determined from the classification data where the classification data is used as a reference to retrieve data from lookup table contained in, for example, a memory. The stream editor compute engineer 120 uses the destination identification to index the LUT to find the destination and associated data relevant to the transmission of the PDU to the destination. The number of times the stream editor compute engine 120 is scheduled to transmit the PDU is based on the following formula:

TTT=CEILING(((LU_LENGTH-LU_OFFSET)+
DID_BEG_DELTA+DID_END_DELTA)/
TRANSMIT_SIZE)

The formula determines the number of times that the transmit queue logic 130 schedules a PDU to be transmitted. LU_LENGTH is the actual packet length received by the RSP. The LU_OFFSET is the amount of data at the beginning of the PDU received by the RSP that should be ignored. The DID_BEG_DELTA and DID_END_DELTA are from the LUT that contains data about the destination. The LUT may be referred to as a destination ID table because it contains information about the destination. The LUT ID table is indexed using the classification data and the DID_BEG_DELTA and DID_END_DELTA retrieved from the LUT are used by the stream editor and compute engine 120 to determine whether to add and remove bits or bytes from the beginning and end of the PDU, respectively. TRANSMIT_SIZE is the size of the packets to be transmitted from the RSP. The result (TTT) of the equation is rounded up (CEILING) to the next whole unit and used as the value representing how many cells need to be transmitted to transmitted to transmit the entire modified or unmodified packet from the RSP.

The transmit queue uses a counter to determine if the appropriate number cells according to the TTT have been transmitted. The TTT (times to transmit) information is stored in memory for a particular PDU. When the transmit queue 130 receives a command to transmit a PDU, one of its tasks will be to read the TTT value from memory and decrement the TTT value by one each time a cell for a packet has been transmitted. When the TTT field has a zero value, then the entire packet has been transmitted. Additional details of the RSP are provided in the attachment to this application.

System Overview

The RSP 100 is designed to work with a Fast Pattern Processor (FPP) and an Agere System Interface (ASI) to process the wire-speed data stream at OC-48c speeds. The FPP may accept a data stream of protocol data units (PDUs) from an industry-standard POS-PHY/UTOPIA Level 3 interface. The PDUs are analyzed and classified, and the FPP outputs the packets and conclusions to the Routing Switch Processor on a POS-PHY Level 3 interface. The information provided by the FPP is used by the RSP to assign the PDU to a queue that has been programmed with QoS, CoS, and PDU modification instructions. The FPP and RSP are configured and updated over a separate configuration bus that connects to the Agere System Interface and host processor.

The RSP features the following external interfaces:

Input interface 235: A 32-bit POS-PHY Level 3 interface for the wire-speed data path input.

Output interface 240: A configurable 32-bit POS-PHY/UTOPIA Level 3 interface for the wire-speed data path output. It can be configured as a single 32-bit interface, two 16-bit interfaces, a 16-bit and two 8-bit interfaces, or four 8-bit interfaces.

Management Interface 245: An 8-bit POS-PHY Level 3 interface to allow sending of packets to the ASI for host processing.

External Scheduler Interface 200: An interface that allows external monitoring and scheduling of the RSP's queues.

SDRAM interface 205: A 64-bit interface for queuing PDUs that supports up to 133 Mhz.

SSRAM interfaces 210, 215, 220, 225: Four separate 32-bit SSRAM interfaces featuring point-to-point memory access at up to 133 Mhz.

Configuration bus interface 230: An 8-bit asynchronous bus for configuring the RSP from the host processor.

The RSP 100 uses a modular architecture with custom logic and programmable compute engines to provide extensive processing capabilities at wire speeds up to OC-48c. The RSP architecture is designed to provide a high level of PDU processing capabilities at wire speed. The RSP accepts PDUs and their classification information on up to 128 logical input ports. It enqueues them on up to 64K programmable queues, then outputs the modified PDUs on up to 256 logical output ports. The RSP receives PDUs and classification information on a 32-bit POS-PHY Level 3 interface. Processed traffic is output on a configurable 32-bit POS-PHY Level 3/UTOPIA Level 3 interface. The RSP also has an 8-bit POS-PHY Level 3 management interface. Internally, the RSP uses custom logic and three programmable Very Large Instruction Word (VLIW) compute engines to process PDUs while maintaining a high throughput. Each compute engine is dedicated to a processing function:

Traffic Management Compute Engine 140: Enforces discard policies, and keeps queue statistics.

Traffic Shaper Compute Engine 145: Ensures QoS and CoS for each queue.

Stream Editor Compute Engine 120: Performs any necessary PDU modifications. This compute engine operates in a pipelined fashion. This architecture allows the RSP to provide a high level of processing capabilities, while maintaining wire-speed performance. The RSP is a building block designed to work with the Fast Pattern Processor and the Agere System Interface. It can also be used with other logic.

Figure 2:
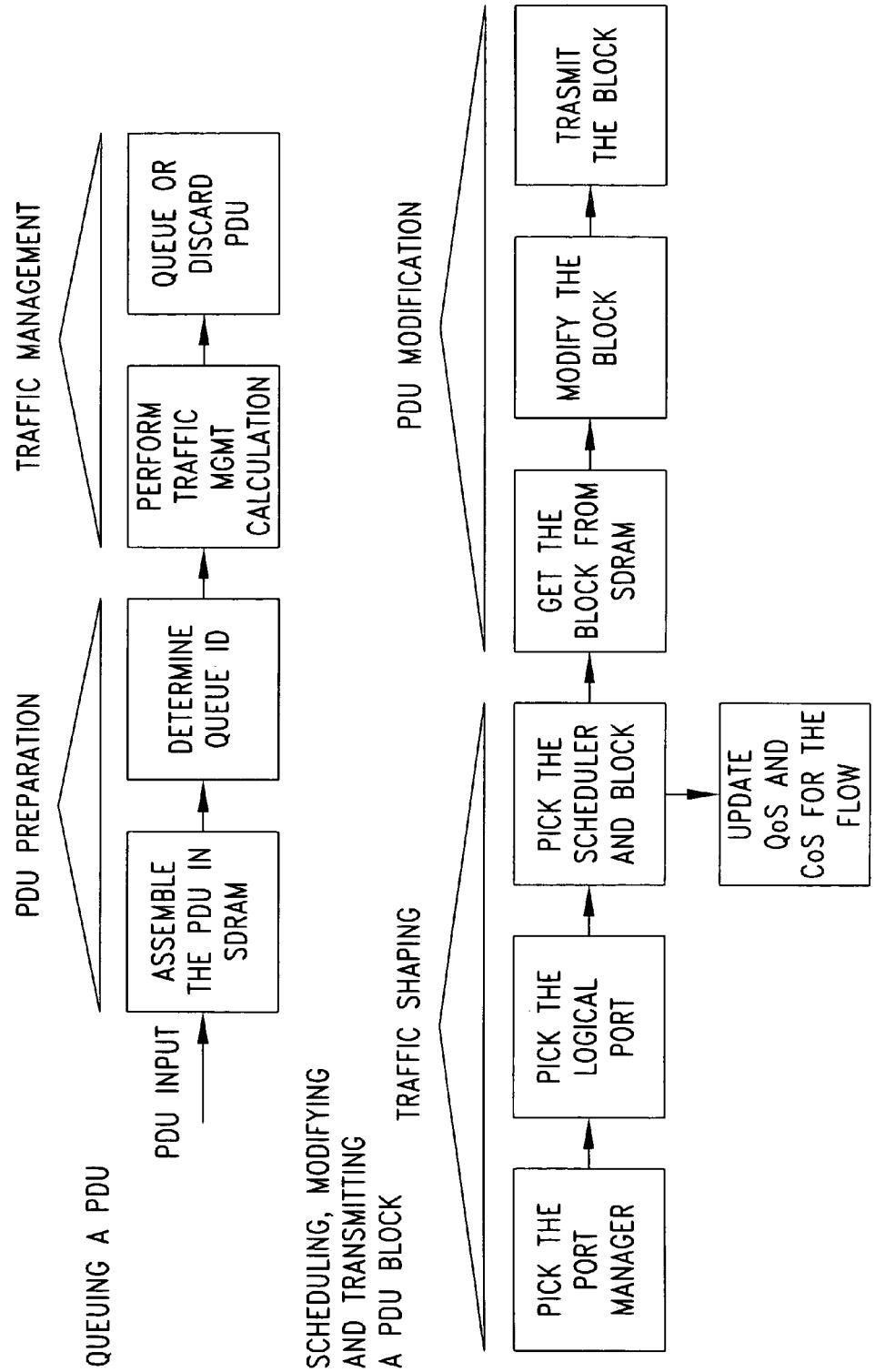
FIG. 2 is a flow diagram illustrating the present invention.

The RSP receives PDUs on up to 128 logical ports. For each PDU, the FPP, or other logic, sends the classification conclusions in the form of a transmit command. This command instructs the RSP how to process the PDU. The PDU is stored in the PDU SDRAM and then added to a queue, if valid. The transmit command determines the queue parameters that determine the QoS, CoS, and any PDU modifications. FIG. 2 illustrates how the data flow processing operates. The RSP routes and processes PDUs in four major processing stages. To process traffic, the RSP:

(1) Prepares the PDU for scheduling: Assembles the blocks into a PDU in SDRAM and determines the destination queue for the PDU.

(2) Performs Traffic Management: Determines if the PDU should be queued. If it should be queued, it is added to the appropriate queue for scheduling.

(3) Selects the next PDU block to be transmitted: Determines the Port Manager to be serviced, determines the Logical Port to be serviced, determines the scheduler to be serviced; and determines the queue to be serviced.

(4) Modifies and transmits the PDU on the appropriate output port: Adjusts the QoS transmit intervals and CoS priority, if necessary; logs PDU, queue, and logical port statistics; performs any necessary PDU modifications; and performs OAM CRC or AAL5 CRC, if necessary.

Programmable PDU Processing

The RSP's flexibility and power are based on the capability to program queues to process PDUs in different ways. Each queue definition includes a destination, scheduling information, and pointers to programs for each of the RSPs VLIW compute engines. By selecting a queue definition that performs the processing a user wants for each queue, the user can configure the RSP to process a wide variety of protocols. In addition, the host processor can dynamically add queue definitions, as they are needed, for example, to set up virtual circuits for ATM.

Compute Engine Programs

The compute engine is shown as part of the stream editor compute engine. To execute, the compute engine uses a program, or list of instructions and parameters for the program. At configuration, a set of programs is defined for each of the three compute engines. A user can define compute engine programs, the exact number depending on internal RAM and the length of the programs. In one embodiment, these programs may not be redefined or updated dynamically. The parameters for the compute engines can be loaded at configuration time or dynamically during operation.

Configuring Ports and Schedulers

Before the queues are defined, a user may (1) configure the Output Ports and Port Managers, (2) create the Logical Ports and assign them to Port Managers, load the compute engine programs, and (3) create schedulers for each Logical Port. The definitions of the schedulers include the program selection for the Traffic Management and Traffic. The shaping compute engine defines QoS instructions, CoS instructions, and traffic management policy, are established during the initial configuration. These steps take place during the initial configuration of the RSP. The compute engine programs are loaded at configuration, but can be selected for queues dynamically.

Queues are defined by (1) Adding the queue to the Stream Editor destination ID table. This table includes a pointer to the Stream Editor compute engine modification instructions for the queue; (2) Defining the compute engine program parameters. These parameters are used for such things as setting thresholds for discard policies, or defining bytes to add or replace when modifying the PDU; (3) Assigning the queue to a scheduler. By assigning a scheduler, a user may select the Traffic Management and Traffic Shaping compute engine programming, as well as the Logical Ports and Port Managers for the queue. These steps can take place during the initial configuration of the RSP, or dynamically, during operation.

RSP Components

As shown in the block diagram, the RSP architecture consists of the following major components:

Input Interface 110: Connects the RSP to the 32-bit POS-PHY from the FPP. It sends the incoming PDUs to the PDU Assembler, and sends the FPP classification conclusions for PDUs to the Transmit Queue 130.

PDU Assembler 115: Assembles received blocks into PDUs.

Transmit Queue 130: Provides the overall control of RSP operations.

Queue Manager Logic 135: Allocates queues.

Traffic Manager Compute Engine 140: based on the queue, determines if a PDU should be queued or discarded, and keeps per queue statistics.

Traffic Shaper Compute Engine 145: Maintains the QoS and CoS for each queue, performing dynamic scheduling.

Stream Editor Compute Engine 120: Modifies the PDU.

Output Interface 125: Accepts blocks from the Stream Editor and sends them to the appropriate Port Manager and Output Port. The Output Interface connects the RSP to the 32-bit POS-PHY/UTOPIA interface that links to the backplane or physical ports, and the 8-bit POS-PHY management interface that links to the ASI and host processor.

To understand how the PDU Assembler works, it is helpful to understand how the FPP processes PDUs. The FPP processes PDUs in two passes: the first pass performs block-level processing, and the second pass performs PDU-level processing. The PDU is read, a block at a time, into the FPP data buffer on the first pass, then read from the FPP data buffer on the second pass. During the second pass, the PDU is transmitted from the FPP queue memory to both the FPP block buffers for processing, and to the RSP. The FPP architecture is pipelined, processing up to 64 PDUs at a time, in what are called PDU contexts. The 64 contexts are configured into two groups: one for first pass processing, and the other for second-pass processing. Typically, the number of contexts configured for second-pass processing is between 32 and 48, creating an output of 32 to 48 interleaved PDUs. The RSP can accept up to 128 interleaved PDUs. The context number for the PDU in the FPP is used as the MPHY port number when the PDU is transmitted across the POS-PHY interface to the RSP. The PDU Assembler uses the context number, or POS-PHY port number, to reassemble the blocks received from the FPP into PDUs, and can reassemble up to 128 simultaneous PDUs. The transmit command can arrive before or after the PDU, depending on how a user may configure the RSP. The PDU is assembled and stored in memory as it arrives, with or without a transmit command.

When the PDU Assembler receives the first block of a new PDU, it requests that the Transmit Queue allocate 256 bytes for the PDU in the RSP's data buffer. The Transmit Queue returns the memory block address for the PDU. If a PDU is more than 256 bytes long, additional 256-byte blocks are requested. As each block is received, the PDU Assembler stores the result in an internal buffer. The PDU Assembler strips off any bytes at the end of a PDU marked by the POS-PHY interface as invalid bytes. When a 64-bit word is assembled, the data is written to the assigned PDU memory block in the RSP's data buffer. The PDU Assembler stores the PDUs in the data buffer. The PDUs are retrieved from the data buffer by the Stream Editor logic. Because of the FPP's pipelined architecture, the PDUs may not be completed in the Assembler in the correct order. When the Assembler receives a new PDU and requests memory for it, the Transmit Queue Logic adds it to a list that tracks the arrival order of the first block of each PDU.

Typically, the Traffic Management Compute Engine 140 policies ensure that the RSP has enough memory for the Assembler to store arriving PDUs. As a failsafe mechanism, if there is not enough available memory for a requested PDU memory block, the Transmit Queue notifies the PDU Assembler. The PDU Assembler then applies back pressure to the POS-PHY input interface to pause the flow of data into the RSP. The blocks in the pipeline that arrive after the back pressure is asserted are stored in the PDU Assembler's internal buffers, so that no information is dropped.

The RSP has a configurable reorder buffer to allow a user to define the type of reordering, if any, a user want to perform on the PDUs. The reorder buffer keeps track of when PDUs arrive, when they are completed, and when the associated transmit command has arrived. The reorder buffer determines the order that incoming PDUs are processed by the traffic manager compute engine. A user can configure the RSP's reorder buffer to provide three types of ordering: (1) maintain arrival order: first arrived, first enqueued, (2) maintain arrival order within priority classes: within a class, first arrived, first enqueued, and (3) enqueue PDUs when they are complete: first complete, first enqueued. The type of reordering chosen by the use may be set at configuration time, and may or may not be changed dynamically.

By default, the RSP enqueues PDUs in the order that they arrive. When the first block of a PDU arrives, the PDU is assigned a place in the reorder buffer. When the RSP has received both the complete PDU and the transmit command for the PDU, that PDU is eligible to be queued. The reorder buffer ensures that the oldest complete PDU with a transmit command is the next PDU enqueued. While this mechanism guarantees that PDUs are enqueued in the order they arrive, it creates a possibility in some applications for head-of-line blocking. For example, if a long PDU arrives ahead of shorter PDUs, the shorter PDUs will have to wait until the long PDU has completely been received by the RSP before they can be enqueued.

For some applications, a user may maintain PDU order only within classes or priority levels. For example, for different classes of traffic or for traffic sent to different locations, a user may not care about the order of PDU arrivals. The order matters in the priority class. By choosing this configuration, a user can maintain the PDU order when necessary, and ignore it when it is not relevant. This configuration reduces the impact of any head-of-line blocking, since only one priority class is affected. A user can define up to four priority levels for PDUs. These priority levels correspond to the FPP's replay priority levels, so that a user assign priorities using the Functional Programming Language. If maintaining the order of PDU arrivals does not matter for a particular application, for maximum speed a user can configure the RSP reorder buffer to enqueue PDUs whenever they are complete and have their transmit commands, regardless of arrival order.

Multicast traffic presents a special case of head-of-line blocking, due to the bandwidth expansion that takes place. Since a multicast PDU must be enqueued multiple times, it could potentially block unicast traffic in the process. To handle this issue, the RSP enqueues unicast and multicast PDUs separately, alternating between the two types, so that multicast traffic does not block unicast traffic. In addition, the RSP can be configured to discard multicast PDUs that exceed a programmable threshold for multicast PDUs in the reorder buffer. If the discard option is not enabled, when the threshold is reached, the RSP asserts back pressure until the number of multicast PDUs in the reorder buffer falls to below the threshold number.

With 128 entries for the FPP's 64 contexts, the reorder buffer is designed to minimize the need for applying back pressure to the FPP. A user can configure the minimum number of free entries in the RSP before back pressure is applied to the RSP. When there are less than the minimum, the RSP asserts PP_PHOLDB to signal the FPP not to begin any new replays until the signal is deasserted. The default minimum number of free entries is 21.

The Transmit Queue Logic performs the high-level control functions for the RSP. These functions coordinate the flow of data through the RSP and include: allocating memory; maintaining the correct PDU order, performing the queue scheduling, maintaining port and scheduler statistics, maintaining linked lists of PDU blocks, and PDUs in queues, requesting parameters from, and passing parameters to, the compute engines. The Transmit Queue Logic is responsible for scheduling the actions taken on a PDU.

The Traffic Management Compute Engine (CE) 140 is called each time a PDU is ready to be added to a queue. The compute engine determines whether to add it to the queue or to discard the PDU, based on the programmed discard policy of the destination queue.

The Traffic Management CE program can make the decision based on (1) memory usage in the RSP: total memory usage, queue memory usage, scheduler memory usage, and port memory usage, (2) parameters provided by the host processor: port threshold parameters, scheduler threshold parameters, queue threshold parameters, and global threshold parameters, (3) a random number supplied to the CE for implementing random discard policies, (4) the size of the PDU, (5) flags received from the PDU transmit command. The use of these flags is programmable, and may be predefined so that the FPL program that sets the flag, and the resulting action defined in the RSP compute engines are coordinated.

Once the Traffic Management CE has processed its instructions for a PDU, it (1) sets a flag indicating whether to enqueue or discard the PDU, (2) updates the queue state, (3) updates any transmit command flags as necessary and passes them on to the Stream Editor CE, and (4) updates the memory usage parameters. The queue definition support discard policies such as RED, EPD, WRED, and PPD, with selectable thresholds.

The Traffic Shaper Compute Engine 145 is called each time a queue is scheduled for transmission. This CE provides QoS shaping for the queue selected for transmission, based on the programmable queue definition. If there is a CoS associated with the queue, the CE also determines the next CoS queue to service, to support, for example, such CoS policies as WFQ or WRR. The RSP schedules rate-based traffic on the basis of scheduling intervals. In order to provide flexibility when implementing VBR QoS schemes, the Traffic Shaper CE has the capability to dynamically update the scheduling interval at each transmission time. The RSP implements priority-based CoS using a simple strict priority system among the CoS queues as defined by the Traffic Shaper Compute Engine. In order to allow the flexibility to implement WFQ, WRR or other CoS schemes, the Traffic Shaper CE can update the CoS queue priorities.

Each queue has a set of parameters, initialized by the host processor, which are provided to the CE upon invocation. A user can define parameters that keep changes persistent between CE invocations. If the Traffic Shaper CE is invoked on a queue which has associated CoS queues, a set of host initialized parameters associated with the currently selected CoS queue is also provided to the CE. The Traffic Shaper CE receives the following parameters: (1) Current CoS queue priority, (2) number of cells/blocks to be transmitted for the current PDU (This can be used to implement schemes where the CoS weighting is based upon amount of data transmitted, instead of number of PDUs), and (3) the current time. The current time can be used to implement leaky token/leaky bucket schemes for GCRA-style interval computations. Each time the Traffic Shaper CE is invoked, it selects the next CoS queue to service, if necessary, updates scheduling interval for QoS, updates persistent per queue state information.

The Stream Editor Compute Engine 120 allows PDU modifications to be programmed for each queue. The PDU modifications for a queue can be defined at system initialization, or can be dynamically assigned during operation. The modification instructions and parameters are part of the programmable queue definition. Typical applications for PDU modifications include: (1) encapsulating PDUs into AAL5: segmenting to ATM cells with appropriate headers, (2) implementing MPLS operations: for example, swapping labels, or pushing tags (3) implementing IP operations: for example, decrementing time-to-live counts, and (4) updating checksums.

The Stream Editor Compute Engine can modify PDUs by: (1) Adding or removing up to 63 bytes to or from the head of a PDU when performing 64-byte segmentation, or 47 bytes when performing 48-byte segmentation, (2) adding or removing up to 15 bytes to or from the tail of a PDU for fixed size cells, (3) modifying data anywhere in the PDU, (4) setting the MPHY port number when applicable, (5) generating a CRC for AAL5 over ATM, and (6) generating CRC-10 for OAM (operation, administration, and maintenance) cells, AAL3/4 cells. The Stream Editor can be programmed to pad or remove data both at the block and the PDU level. The data that is added to the head or tail can also be modified.

The Stream Editor keeps track of up to one million queue destinations by maintaining a table of the queue entries, called destination IDs. The large number of destination IDs allows each of the 64K queues to support multiple modification instructions, for example, to support MAC addressing. This table (LUT) may be configured by the host processor at initialization time, and can also be dynamically updated to add or change queue definitions. The destination IDs are assigned for each PDU in the FPP by the FPL code, and passed to the RSP in the transmit command. Each destination ID defined in the FPL code must also be created in the Destination ID table, which maps each destination ID to a queue, and maps the queue to compute engine instructions.

The POS-PHY Level 3 output interface supports the use of multiple data streams on a single interface using the MPHY capability. The Stream Editor compute engine can assign MPHY port numbers. This programmable feature gives a user flexibility for MPHY numbering according to user application needs. Some possibilities include assigning MPHY numbers based on FPP input port numbers, queues, Port Managers, and Logical Ports. The number of MPHY ports on the RSP is limited to a maximum of 256. The maximum number for a single Output Port depends on its width. A user can assign 256 Logical Port connections to a 32-bit Output Port, 128 connections to a 16-bit Output Port, or 64 connections to an 8-bit Output Port.

The RSP supports two modes for scheduling. The RSP's scheduling can be controlled internally, or by external logic, depending on the mode a user uses.

The RSP internal scheduler provides support for common traffic shaping or rate strategies, including:

(1) Constant-bit-rate (CBR) traffic. CBR scheduling allows the RSP to support guaranteed rates for connections.

(2) Variable-bit-rate (VBR) traffic. VBR scheduling supports dynamic adjustments to a traffic rate. The RSP can be programmed to dynamically schedule VBR traffic based on a number of factors.

(3) Unspecified-bit-rate (UBR) traffic. This category allows the RSP to allocate unused fixed-rate bandwidth for traffic that does not have a fixed rate. This is "best effort" traffic that also typically includes communication with the host and other management traffic.

(4) Two-level traffic shaping for virtual paths. The RSP allows a user to define a fixed amount of bandwidth for a set of individually shaped connections to create virtual paths, also called virtual pipes or channelized connections.

Traffic scheduling and shaping is defined by the RSP's scheduling logic and the programmable queue definitions. The high-level control of RSP scheduling functions is provided by the internal logic; the traffic shaping is defined by the configuration of the RSP, the Traffic Shaping compute engine, and the programmable queue definitions.

The RSP features an External Scheduling Interface that allows a user to monitor and schedule queues for transmission using external logic, instead of the RSP's internal scheduling logic. This feature allows a user to use custom algorithms, or to dynamically set priorities based on traffic conditions. For example, the External Scheduling Interface can be used to connect to a switch fabric that is making global decisions about traffic scheduling.

Although the invention has been described with reference to exemplary embodiments, it is not limited to those embodiments. Rather, the appended claims should be construed to include other variants and embodiments of the invention, which may be made by those skilled in the art without departing from the true spirit and scope of the present invention.

What is claimed is:

1. A method of processing comprising:
 (a) receiving a data packet;
 (b) modifying the data packet employing information associated with a destination of the data packet to determine what modifications of the data packet are needed for transmission to the destination; and
 (c) before step (b), determining based on the information a number of times to transmit (TTT) portions of the data packet to transmit the entire packet to the destination.

2. The method of claim 1 further comprising:
 (d) providing first circuitry for determining the number of TTT portions; and
 (e) providing second circuitry different from the first circuitry for modifying the data packet.

3. The method of claim 1 wherein the determining is independent of the modifying.

4. The method of claim 1 wherein the TTT portions are sized according to a transmission standard.

5. The method of claim 1 wherein the number of TTT portions is based on an actual length of the data packet.

6. The method of claim 1 further comprising determining the entire packet has been transmitted based on counting transmitted TTT portions.

7. The method of claim 1 wherein the entire packet is an entire modified packet.

8. The method of claim 1 wherein the data packet is received over a communications network.

9. The method of claim 1 wherein the modifying includes modifying the data packet for transmission over a communications network.

10. The method of claim 1 wherein the modifying includes adding or removing data from the data packet.

11. The method of claim 1 wherein the data packet is an ATM cell.

12. The method of claim 1 wherein the data packet is a fabric cell.

13. The method of claim 1 wherein the data packet is a portion of a frame-based transmission of a data.

14. A routing switch processor, comprising:
 an interface that receives a data packet over a communications network;
 a processing engine, coupled to the interface, that modifies the data packet for transmission; and
 a transmit queue, coupled to the interface and the processing engine, that determines, based on information associated with the destination of the data packet received by the interface, a number of times to transmit (TTT) portions of the data packet to transmit the entire data packet before the processing engine modifies the data packet, wherein the processing engine employs the information to determine what modifications of the data packet are needed for transmission to the destination.

15. The routing switch processor as recited in claim 14 wherein the routing switch processor operates at wire-speed.

16. The routing switch processor as recited in claim 14 wherein the transmit queue schedules the processing engine to transmit data based on the number of TTT.

17. The routing switch processor as recited in claim 14 wherein the transmit queue employs a counter to determine if transmission by the routing switch processor is complete based on the number of TTT.

18. The routing switch processor as recited in claim 14 wherein the transmit queue determines the number of TTT based on the length of the data packet received by the interface and a size of packets to be transmitted by the routing switch processor.

* * * * *